(Model.)
D. C. BALLARD.
TONGUE SUPPORT.
No. 283,188. Patented Aug. 14, 1883.
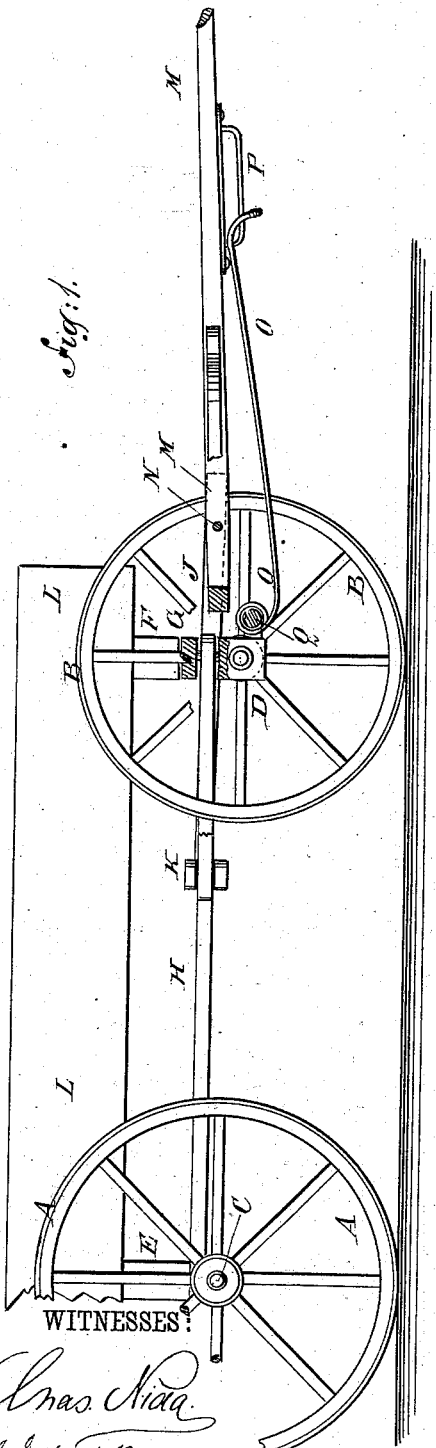
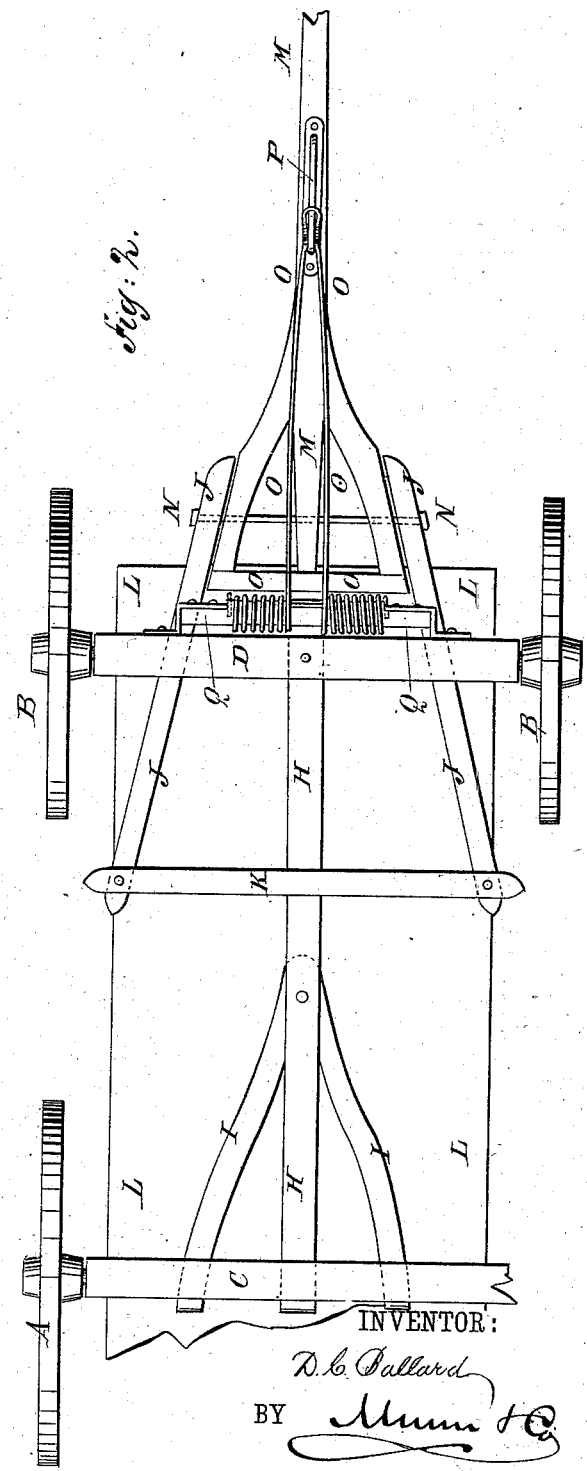
WITNESSES:
Chas. Nida
C. Sedgwick
INVENTOR:
D. C. Ballard
BY Munn & Co.
ATTORNEYS.

UNITED STATES PATENT OFFICE.

DEWITT CLINTON BALLARD, OF CENTREVILLE, MONTANA TERRITORY.

TONGUE-SUPPORT.

SPECIFICATION forming part of Letters Patent No. 283,188, dated August 14, 1883.

Application filed May 21, 1883. (Model.)

*To all whom it may concern:*

Be it known that I, DEWITT CLINTON BALLARD, of Centreville, in the county of Meagher and Territory of Montana, have invented a new and useful Improvement in Spring-Supporters for Wagon-Tongues, of which the following is a full, clear, and exact description.

Reference is to be had to the accompanying drawings, forming a part of this specification, in which similar letters of reference indicate corresponding parts in both the figures.

Figure 1 is a side elevation of a wagon to which my improvement has been applied, parts being broken away. Fig. 2 is an under side view of the same.

The object of this invention is to relieve the horses' necks from the strain of having to support the weight of the wagon-tongue, while allowing the connection between the tongue and wagon to have such a flexibility that the wagon can have the movements necessary in adjusting itself to uneven ground.

The invention consists in the detailed construction and combination of parts, essentially as hereinafter fully set forth and claimed.

A are the rear wheels, B are the forward wheels, C the rear axle, D the forward axle, E the rear bolster, F the forward bolster, G the sand-board, H the reach, I the rear hounds, J the forward hounds, K the sway-bar, and L the body, of an ordinary wagon. M is the tongue, which is hinged to the forward hounds, J, by a bolt, N, in the ordinary manner. O is a spring, the forward end of which is connected with and slides upon the keeper P, attached to the middle part of the tongue M. The rear part of the spring O is coiled around, and its ends are attached to a bar, Q, the ends of which are secured by bolts, clips, or other suitable means to the forward axle, D, as shown in the drawings, to the forward bolster, F, or to the forward end of the wagon-body L. With this construction the tongue M will be held in a horizontal position or nearly in a horizontal position by the tension of the spring O, and at the same time will be free to move to adjust itself to the movements of the wagon in passing over uneven ground.

Having thus fully described my invention, I claim as new and desire to secure by Letters Patent—

The combination, in a vehicle, with the forward axle, D, and the tongue M, having the keeper P on its under side, of the looped spring O, with its forward end curved downward and adapted to slide on the keeper P, and having its rear ends each coiled around the bar Q of a bracket fastened to the axle, all arranged in a plane below the tongue, essentially as shown and described.

DEWITT CLINTON BALLARD.

Witnesses:
 FRANK P. STERLING,
 TERRENCE O'DONNELL.